(12) United States Patent
Sakazaki et al.

(10) Patent No.: US 7,464,968 B2
(45) Date of Patent: Dec. 16, 2008

(54) LOW PERMEABILITY ELASTIC SEALING RING

(75) Inventors: Kazushige Sakazaki, Komaki (JP); Koji Hioki, Itinomiya (JP)

(73) Assignee: Tokai Rubber Industries, Ltd. (JP)

( * ) Notice: Subject to any disclaimer, the term of this patent is extended or adjusted under 35 U.S.C. 154(b) by 3 days.

(21) Appl. No.: 11/067,105

(22) Filed: Feb. 25, 2005

(65) Prior Publication Data

US 2005/0218606 A1 Oct. 6, 2005

(30) Foreign Application Priority Data

Mar. 30, 2004 (JP) ............................. 2004-101395

(51) Int. Cl.
*F16L 17/00* (2006.01)

(52) U.S. Cl. ..................... 285/242; 285/236; 285/252; 277/910; 277/650

(58) Field of Classification Search ............... 277/910, 277/627, 650, 652, 654; 285/242, 252–254, 285/236
See application file for complete search history.

(56) References Cited

U.S. PATENT DOCUMENTS

| | | | | |
|---|---|---|---|---|
| 2,967,805 | A | * | 1/1961 | Forestek .................... 205/73 |
| 3,549,156 | A | * | 12/1970 | Van Vleet et al. ........... 277/652 |
| 5,044,675 | A | * | 9/1991 | Sauer ......................... 285/256 |
| 5,209,527 | A | * | 5/1993 | Hohmann et al. ........... 285/242 |
| 6,068,303 | A | * | 5/2000 | Hollnagle ................... 285/319 |
| 6,443,502 | B1 | * | 9/2002 | Iida et al. .................... 285/351 |
| 6,517,080 | B1 | * | 2/2003 | Pressler ..................... 277/440 |
| 6,543,785 | B1 | * | 4/2003 | Katayama et al. .......... 277/534 |
| 6,576,342 | B1 | * | 6/2003 | Cerf et al. .................. 428/413 |
| 6,607,218 | B2 | * | 8/2003 | Sakazaki et al. ............ 285/226 |
| 6,755,422 | B2 | * | 6/2004 | Potter ......................... 277/652 |
| 2004/0157035 | A1 | * | 8/2004 | Guizzetti et al. ........... 428/66.6 |

FOREIGN PATENT DOCUMENTS

JP 2003-287180 10/2003

OTHER PUBLICATIONS

Patent Abstracts of Japan; Publication No. 2003-287180; Quick Connector.

* cited by examiner

*Primary Examiner*—Patricia Engle
*Assistant Examiner*—Gilbert Lee
(74) *Attorney, Agent, or Firm*—Andrus, Sceales, Starke & Sawall, LLP

(57) ABSTRACT

A laminated low-permeability elastic ring (40) comprising an outer layer (40A) of a low permeability material that possesses impermeability to automotive fuel, and an inner core part (40B) of a low temperature-resistant material with excellent low temperature performance in order to maintain high elastic strength at low temperatures for the low permeability material layer.

10 Claims, 8 Drawing Sheets

(A)

(B)

LOW PERMEABILITY ELASTIC SEALING RING

TECHNICAL FIELD

The present invention relates to an elastic sealing ring that forms a seal for use in a fuel supply piping system, and more particularly to a low permeability elastic sealing ring with excellent impermeability to fuel.

BACKGROUND ART

In automotive fuel supply pipes, an elastic sealing ring is fitted into the connector that connects one piping component to another piping component, so that this elastic sealing ring prevents the fuel from leaking between one piping component and another piping component.

In recent years, permeation of automotive fuel from the piping system is being regulated more strictly, and it is anticipated that these regulations will become increasingly stringent in the future.

Accordingly, not only must the elastic sealing ring prevent leakage of the fuel from the fuel supply piping, but it must have excellent impermeability to the fuel, i.e., low permeability is required.

An elastic sealing ring is mounted in the connection joint to connect the fuel supply hose to a rigid companion pipe. The elastic sealing ring forms a seal between the connection joint and the companion pipe. The sealing ring must provide excellent impermeability to the fuel, i.e. low permeability is required.

However, if the sealing material is impermeable to fuel (for example fluoro rubber or fluororesin) but has poor low-temperature performance, there may be a problem with poor sealing ability due to a loss of elastic strength at low temperatures.

Heretofore, the countermeasure has been to use an elastic sealing ring that has excellent low temperature properties in addition to an elastic sealing ring that has low permeability, and the use of an elastic sealing ring that has excellent low temperature properties in combination with an elastic sealing ring that has low permeability has been suggested.

For example, as disclosed in Japanese Unexamined Patent Application Publication (Kokai) No. 2003-287180 a piping connection joint (quick connector) is described in which an elastic sealing ring that has low permeability is combined together with an elastic sealing ring that has excellent low temperature properties.

A concrete example of the above is shown in FIG. 8.

In this example Figure, 200 is a quick connector connection joint, and 202 is the connector body that forms the main body Connector body 202 has a tubular shape, with a retainer holding component 204 at one end in the axial direction, hose connector component 206 at the other end, and a housing 208 in the middle.

Component 210 is a retainer that is held in a fixed position along the axial direction separated from a retainer holding component 204 which engages a ring-shaped protruding engagement flange component 213 at its interior peripheral edge fro providing support to companion pipe 212 to prevent it from falling out of the housing 208.

A pair of elastic sealing rings 214, 216 are mounted inside housing component 208, and are in a state of elastic contact with the exterior peripheral surface of companion pipe 212 to form a seal between housing 208 and companion pipe 212, i.e., between quick-connect 200 and companion pipe 212.

Furthermore, 218 is a bushing mounted in housing 208 against the exterior peripheral surface of companion pipe 212.

Elastic sealing ring 214 is formed from a fluoro rubber material that has a low permeability toward fuel. In other words, elastic sealing ring 214 is a low permeability elastic sealing ring.

One of the elastic sealing rings 216 is formed from a low temperature-resistant material of, for example, NBR (nitrile rubber) with excellent low temperature performance that maintains high elasticity at low temperatures. In other words, elastic sealing ring 216 is an elastic sealing ring with excellent low temperature performance (low temperature resistance).

Low permeability elastic sealing ring 214 is formed from a low permeability material such as fluoro rubber and the like, and loses its elastic power as it hardens at low temperature, and when vehicle body vibrations increase, the favorable compliant deformation with respect to the relative positions of companion pipe 212 and housing 208 is lost, and because the sealing ability is diminished, the goal of maintaining the sealability is separated from the excellent low temperature performance in elastic sealing ring 216, in other words it is used in combination with low permeability elastic sealing ring 214.

Thus, in the case which requires a minimum of the 2 elastic rings 214 and 216, the housing 208 must of an appropriate length to accommodate both elastic rings, causing the quick connector 200 to end up being even longer. Stated otherwise there must be sufficient linear space in the axial direction to accommodate the connector component for companion pipe 212 and the fuel transport hose.

Since the space for piping in vehicles is limited, the use of 2 elastic rings is undesirable in the sense of using the space efficiently.

Moreover, when fitting the elastic sealing rings into connector body 202, a much longer fitting time is required to fit two separate elastic sealing rings 214, 216, and produces a fitting problem.

SUMMARY OF THE INVENTION

The objective of the present invention is a single low permeability elastic sealing ring with a sealing component having the shortest possible length in the axial direction, such that effective use of the space in the piping is realized with minimum fitting time and effort.

The preferred embodiment of the present invention is a multi-layer elastic sealing ring comprising an outer low permeability layer formed from a material that possesses impermeability to automotive fuel, and an inner core layer having a higher elastic strength at low temperature than the outer low permeability layer, and having a low temperature-resistant characteristic.

More specifically, the low permeability layer material is either a fluoro rubber or a fluororesin and the inner core layer is composed from and any of NBR, NBR+PVC, FVMQ, VMQ, EPDM, or TPO.

The characteristic element in of the elastic sealing ring is that it be fitted in between a fuel supply hose connected to a companion pipe to form a seal between them.

More particularly, the elastic sealing ring is adapted to be mounted inside the housing of a connection joint that connects a fuel supply hose with a companion pipe to form a seal between the connection joint and the companion pipe.

In accordance with the present invention, the multi-layer single elastic ring of the present invention possesses two functions having both low temperature resistant performance and low permeability toward fuel.

The low-permeability layer in the elastic sealing ring of the present invention may comprise any fluororesin can be used such as, for example, fluoro rubber (FKM) or THV (a thermoplastic fluororesin formed from the 3 monomers tetrafluoroethylene, hexafluoropropylene, and vinylidene fluoride), PVDF (poly(vinylidene fluoride)), ETFE (ethylene-tetrafluoroethylene fluororesin), or PTFE (tetrafluoroethylene fluororesin), and the low-temperature resistant layer in the elastic sealing ring of the present invention may comprise any low temperature elastomeric composition such as, for example, NBR (nitrile rubber), NBR+PVC (blend of nitrile rubber and poly(vinyl chloride)), FVMQ (fluorosilicone rubber), VMQ (vinyl methyl silicone rubber), EDMQ (ethylene propylene rubber) and TPO (thermoplastic olefin (the main component is an olefin thermoplastic elastomer)).

The present invention includes the suitable application of an elastic sealing ring to be fitted in between a fuel supply hose connected to a companion pipe to form a seal between them.

In addition, the present invention includes the suitable application of an elastic sealing ring mounted inside the housing of the connection fitting that connects a fuel supply hose to a companion pipe to form a seal between the connection fitting and the companion pipe.

The elastic sealing ring may be tube-shaped in its entirety, for application in a quick connector with (a) a companion pipe inserted into one end thereof in the axial direction and being held by a socket-shaped retainer, and a connector provided with a hose connector component connected to the end of the hose at the other end, and (b) held in a fixed state along the axial direction from the retainer holder component, with the retainer acting to prevent a falling out of the companion pipe locked in the axial direction at the engagement flange component on the outer surface of the companion pipe where it is mounted on the inner surface of the connector body of the quick connector.

DETAILED DESCRIPTION OF THE PREFERRED EMBODIMENTS

Figures 1A, 1B:
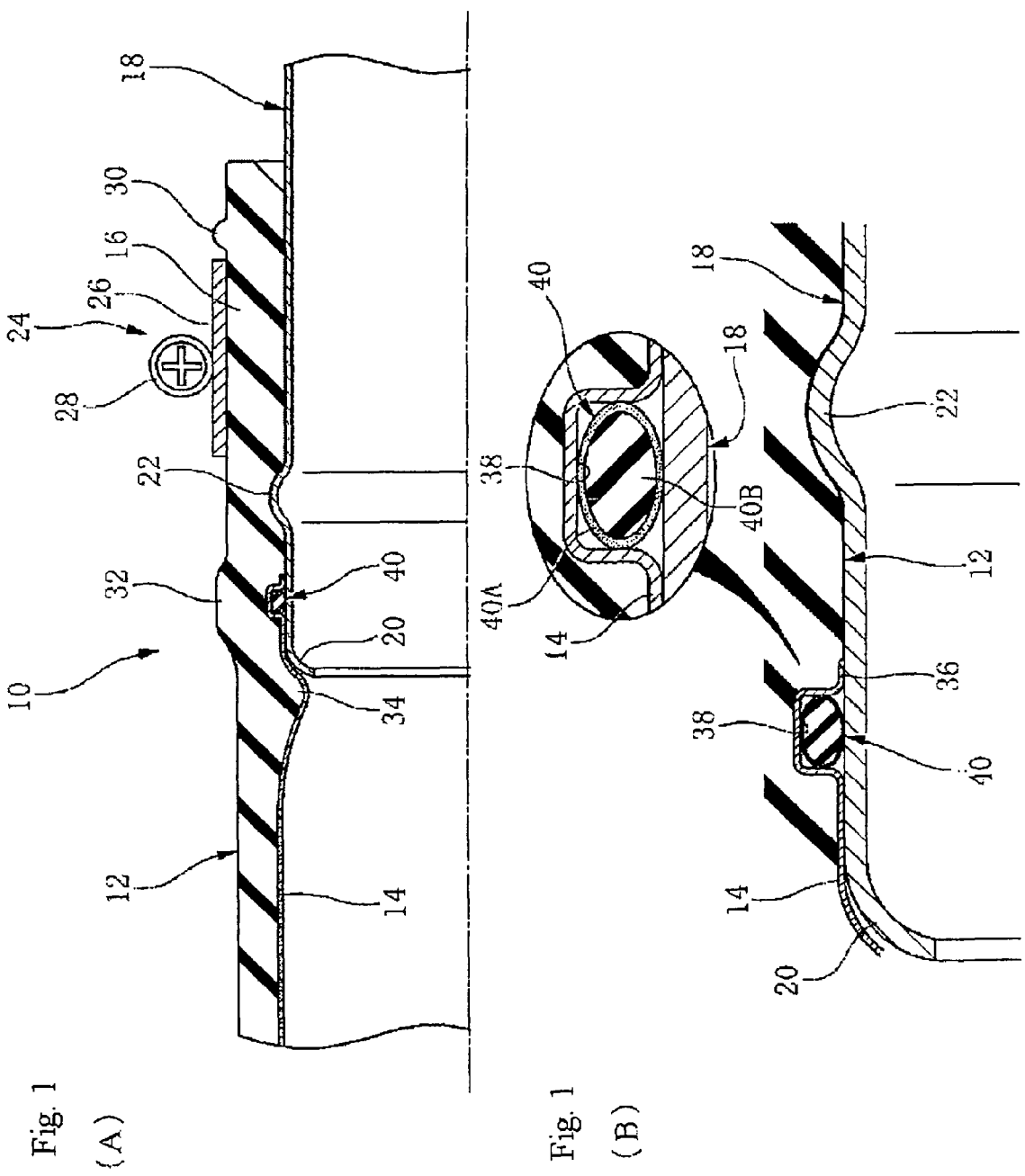
FIGS. 1A and 1B show the design of a connecting configuration for a companion pipe and a hose with a mounted elastic sealing ring for one embodiment of the present invention.

The following embodiments of the present invention are discussed in detail on the basis of the accompanying figures:

In FIG. 1, 10 is a fuel supply hose (referred to below simply as hose), 12 is hose body piping formed from an elastic body that forms the main body, and 14 is a laminated layer formed on the inner surface, which is a hard resin layer that functions as a barrier layer possessing impermeability to fuel.

This resin layer 14 is not laminated over the entire length of the inner surface of hose body piping 12 and instead the end part 16 of the hose 10 is left exposed, so that the inner surface of hose body piping 12 is directly exposed at end part 16.

A metal companion pipe 18 represents a connection partner of the quick connect assembly and includes a straight tube with a straight shape in the axial direction having an outer diameter of slightly larger diameter than the inner diameter of end part 16.

This companion pipe 18 has an insertion end with a curved leading edge 20 which is curved in the centripetal direction and a protuberance 22 which is formed in a ring shape in the radially outward direction located along the axial direction spaced rearwardly from the leading edge 20.

Figure 3:
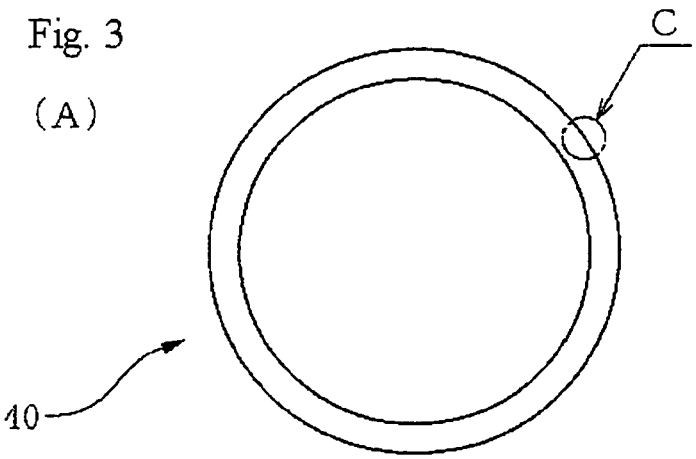
FIGS. 3A, 3B, 3C and 3D show the design of a configuration of the elastic sealing ring of FIGS. 1 and 2 as a single part.
Figure 3:
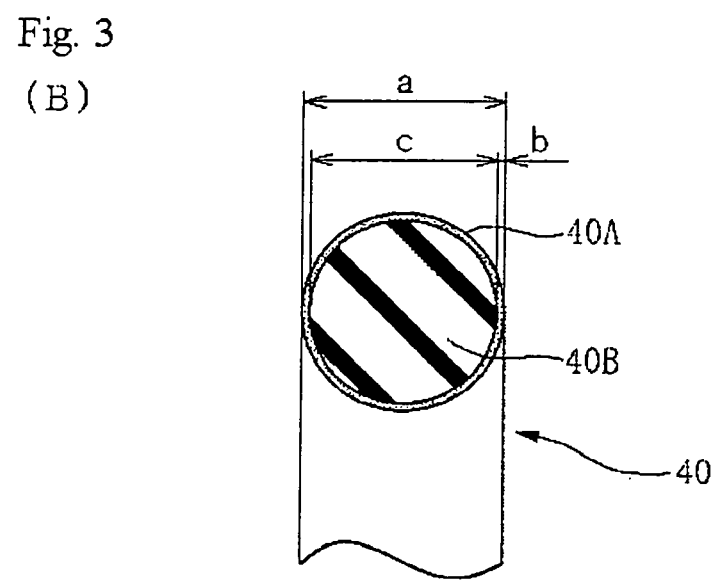
Figure 3:
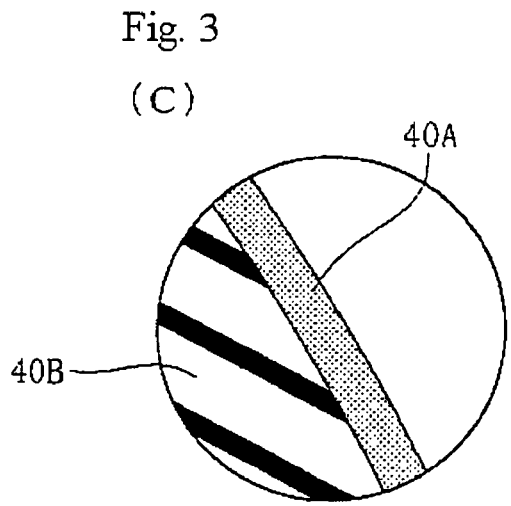
Figure 3:
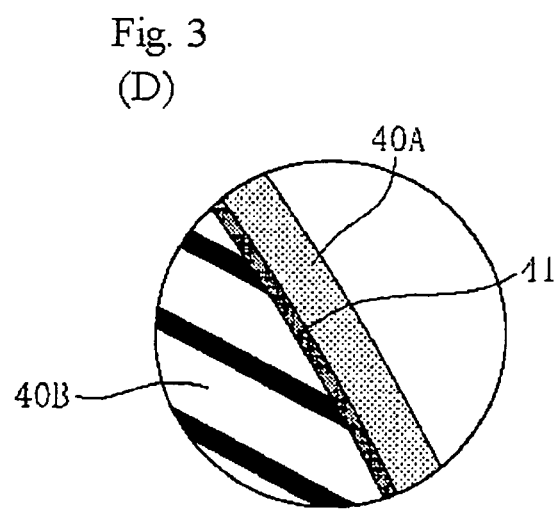

As shown in FIG. 3 a clamping member 24 is placed over the end part 16 to clamp the hose body 12 to the outer surface of companion pipe 18.

The clamping member 24 includes a belt-shaped tightening member 26 and a tightening mechanism 28.

The clamping member 24 is positioned on the outer surface of the hose body 12 between two ring-shaped protruding parts 30, 32 which protrude from the hose body 12.

In addition the hose 10 is provided with a ring-shaped protruding part 34 which protrudes from the inner surface in a radial direction inwardly, i.e., toward the center of the hollow tube body 12.

When companion pipe 18 is inserted against the inner surface through the opening at the end of the shaft of hose 10, protruding part 34 acts to regulate the extent of insertion adjacent to bend 20 of the leading edge of companion pipe 18.

With the companion pipe fully inserted into the hose body the protuberance 22 in the companion pipe 18 will be positioned to the right of leading edge 36 of resin layer 14 as shown in FIG. 1(B). More specifically the protuberance 22 is positioned between leading edge 36 and the clamping part 26 of clamping member 24.

Figure 2:
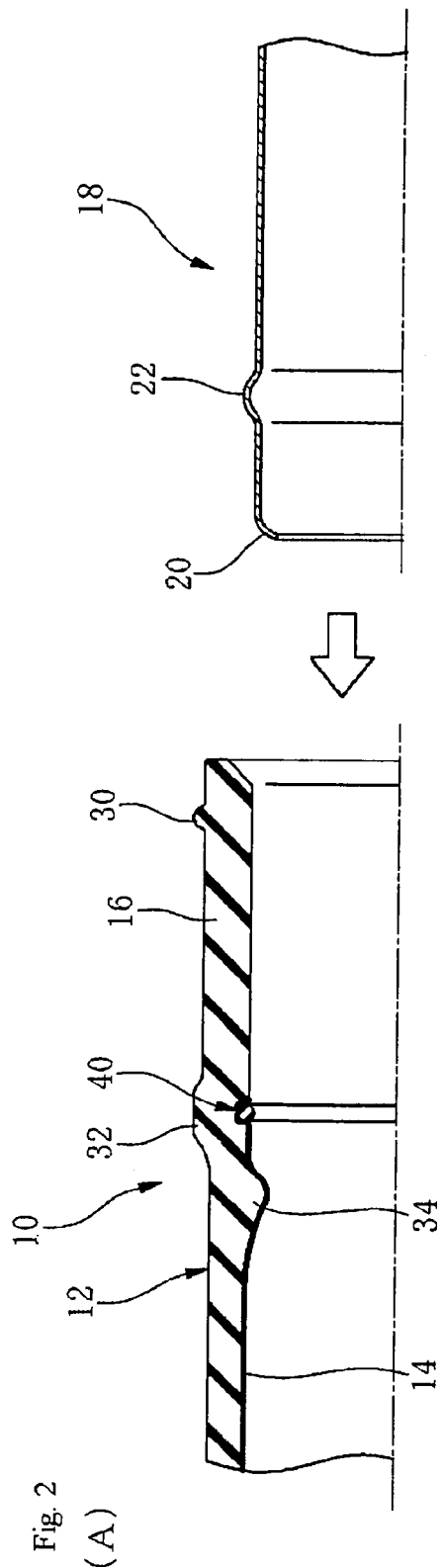
FIGS. 2A and 2B show the design for the condition prior to connecting the hose and the companion pipe of FIG. 1.
Figure 2:
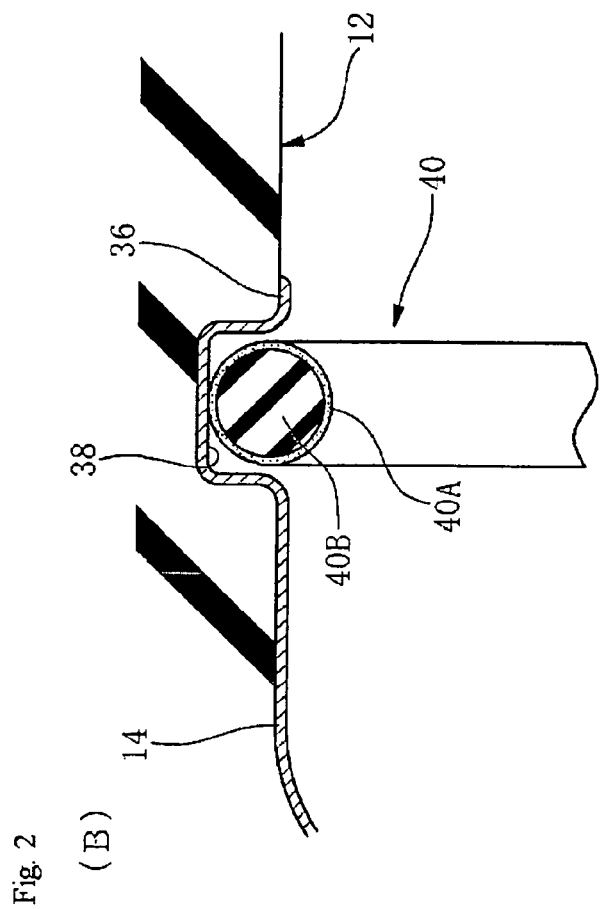

A circular ring-shaped groove 38 is formed as a concavity in the hose body 12 in the vicinity of leading edge 36 of resin layer 14 as shown in detail in FIG. 2(B). FIG. 3 shows the mounting of an elastic sealing ring 40 with low permeability that is impermeable to fuel in the groove 38.

In this embodiment, the elastic sealing ring 40 is an 0-ring.

As shown here in FIGS. 2A and 2(B), before companion pipe 18 is inserted, the inner peripheral edge of elastic sealing ring 40 protrudes in the radial direction inwardly from ring groove 38.

This ring groove 38 is formed at a position that possesses substantially the same inner diameter as the end part 16, and consequently elastic sealing ring 40 protrudes in the radial direction inward from the inner surface of end part 16 prior to the insertion of companion pipe 18.

Thus, when companion pipe 18 is inserted in the axial direction into the opening of the end of the shaft of hose 10, elastic sealing ring 40 undergoes a compressive change in the radial direction outward due to the outer surface of companion pipe 18, and in this state a satisfactory seal is formed between the outer surface of companion pipe 18 and the inner surface of hose 10, more specifically the inner surface of resin layer 14.

In the present embodiment, companion pipe 18 can be connected with hose 10 in the following way.

As shown in FIG. 2(A), companion pipe 18 is inserted into hose 10 in the axial direction through the opening of the end of the shaft.

While it is being inserted inside, bend 20 at the leading edge of companion pipe 18 reaches the position of radially inward protruding part 34 of hose 10.

During this action, protuberance 22 of companion pipe 18 does not pass over leading edge 36 of resin layer 14 so that it does not encounter significant resistance to insertion due to resin layer 14 in this process, and consequently companion pipe 18 can easily be inserted into hose 10 smoothly and with little force.

The insertion of companion pipe 18 together with the inner surface of hose 10, more specifically with elastic sealing ring 40 maintaining the attachment at ring groove 38 of the inner surface of resin layer 14, causes an elastic compressive change in the radial direction outwards due to the outer surface of companion pipe 18, to form a satisfactory seal between the outer surface of companion pipe 18 and the inner surface of resin layer 14.

Afterward, as shown in FIG. 1, leading edge 16 in hose 10 is constricted from the outer surface by clamping member 24 as a way to reduce the diameter, and leading edge 16 is fastened and clamped against companion pipe 18.

During this action, protuberance 22 is positioned to the left of the clamping part from clamping member 24 as in FIG. 1. In other words, in a position to the right of protuberance 22 as in the Figure, leading edge 16 is constricted by clamping member 24 as a way to reduce the diameter, and is clamped.

The above elastic sealing ring 40 has a double-layer constitution, with a core part (inner layer) 40B and a sheathing outer layer 40A, each formed from different materials.

This outer layer 40A is formed from a low permeability material layer possessing impermeability toward fuel, and core part 40B is formed from a low temperature-resistant material layer with excellent low temperature performance that maintains high elasticity at low temperatures. Furthermore, it is preferable for core part 40B and outer layer 40A to be bonded.

For this bonding between outer layer 40A and core part 40B, the bonding component is included in each of the constituent materials of outer layer 40A and core part 40B as shown in FIG. 3(C)(i), where satisfactory bonding is effected by the bonding component, or the bonding agent is applied as a coating on outer layer 40A and core part 40B as is shown in FIG. 3(C)(ii), where satisfactory mutual bonding is effected by bonding agent layer 41.

In the above described embodiments, fluoro rubber (FKM) and fluororesin (for example THV, PVDF, ETFE, and PTFE) are suitable for use as outer layer 40A and NBR, NBR+PVC, FVMQ, VMQ, EPDM, and TPO are suitable for use as core part 40B.

Suitable combinations of the constituent material of outer layer 40A and the constituent material of core part (inner layer) 40B are shown below in Table 1 with the characteristics possessed by each corresponding constituent material:

TABLE 1

Elastic sealing ring (O-ring) Materials and Dimensions

| Materials | | Dimensions (mm) | | |
| --- | --- | --- | --- | --- |
| Outer layer | Inner layer | Cross-sectional outer diameter (a in the Figure) | Outer layer thickness (b in the Figure) | Inner layer thickness (core diameter) (c in the Figure) |
| Fluoro rubber | NBR | 0.5~5 | 0.005~0.2 | 0.8~2.995 |
| (FKM) | NBR + PVC | 0.5~5 | 0.005~0.2 | 0.8~2.995 |
| (for example | FVMQ | 0.5~5 | 0.005~0.2 | 0.8~2.995 |
| vinylidene | VMQ | 0.5~5 | 0.005~0.2 | 0.8~2.995 |
| fluoride-hexafluoropropylene | EPDM | 0.5~5 | 0.005~0.2 | 0.8~2.995 |
| fluoro rubber copolymers) | TPO | 0.5~5 | 0.005~0.2 | 0.8~2.995 |
| Fluororesin | NBR | 0.5~5 | 0.05~0.2 | 0.8~2.95 |
| (THV) | NBR + PVC | 0.5~5 | 0.05~0.2 | 0.8~2.95 |
| (PVDF) | FVMQ | 0.5~5 | 0.05~0.2 | 0.8~2.95 |
| (ETFE) | VMQ | 0.5~5 | 0.05~0.2 | 0.8~2.95 |
| (PTFE) | EPDM | 0.5~5 | 0.05~0.2 | 0.8~2.95 |
| | TPO | 0.5~5 | 0.05~0.2 | 0.8~2.95 |

Fluoro rubber (FKM) (for example vinylidene fluoride-hexafluoropropylene fluoro rubber copolymers):
  Fuel oil resistance with low permeability to gasoline. However, it has little low-temperature brittleness and scant low temperature sealability.
Fluororesin (THV, PVDF, ETFE, PTFE):
  Unusually low gasoline permeability. However, its elastic region is narrow, and it is not satisfactory as a sealing material.
NBR: Good fuel oil resistance, resistance to compression set, and wear resistance.
NBR+PVC: Good fuel oil resistance, resistance to compression set, and wear resistance.
FVMQ, VMQ: In addition to possessing high heat resistance, low-temperature resistance, since the oil resistance is unusually good, it is suitable for applications that require oil resistance at low temperature and fuel resistance.
EPDM: Excellent thermal resistance.
TPO: Having only an olefin composition, it can be readily incinerated or recycled and thus has a low environmental load.

In addition to the low temperature performance as shown above in Table 1, when thermal performance is called for, the use of FVMQ, VMQ and EPDM is preferred as the constituent material for core part 40B, and when wear resistance and resistance to permanent deformation (long-term stability) are called for, the use of NBR and NBR+PVC is preferred. Moreover, TPO can be used in order to minimize the environmental load.

Furthermore, the cross-sectional outer diameter a shown in FIG. 3(B) of elastic sealing ring 40 formed from an O-ring in Table 1, is shown to be a combination of the values for the thickness b of outer layer 40A and the thickness (core diameter) c of core part (inner layer) 40B.

Moreover, Table 1 indicates the acceptable range obtained for cross-sectional outer diameter a and the corresponding preferred ranges for outer layer thickness b and inner layer thickness c.

Since elastic sealing ring 40 as in the above embodiment possesses the two functions of low temperature performance and low permeability to fuel, the number of required elastic sealing rings can be fewer.

For this reason, the space along the axial direction needed for the sealing component in hose 10 can be shorter, and in addition it is possible to reduce the time and effort to do the fitting of the elastic sealing ring.

In the above embodiment, elastic sealing ring 40 is formed from an O-ring, but the elastic sealing ring in question can be constituted in various other configurations.

Figure 4:
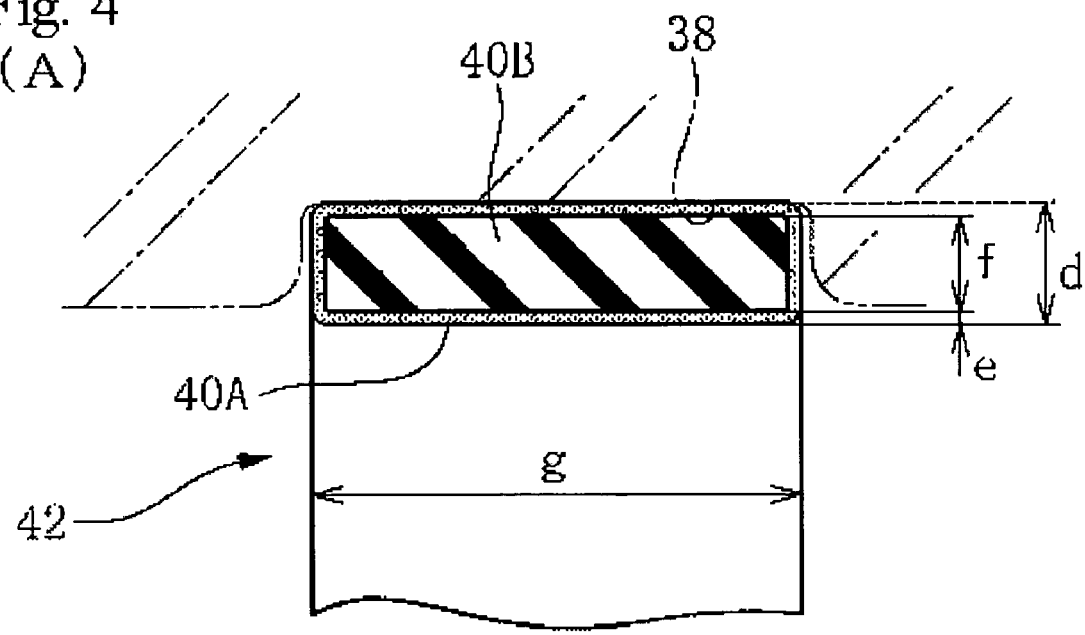
FIGS. 4A and 4B show the design of another exemplary form of the elastic sealing ring.
Figure 4:
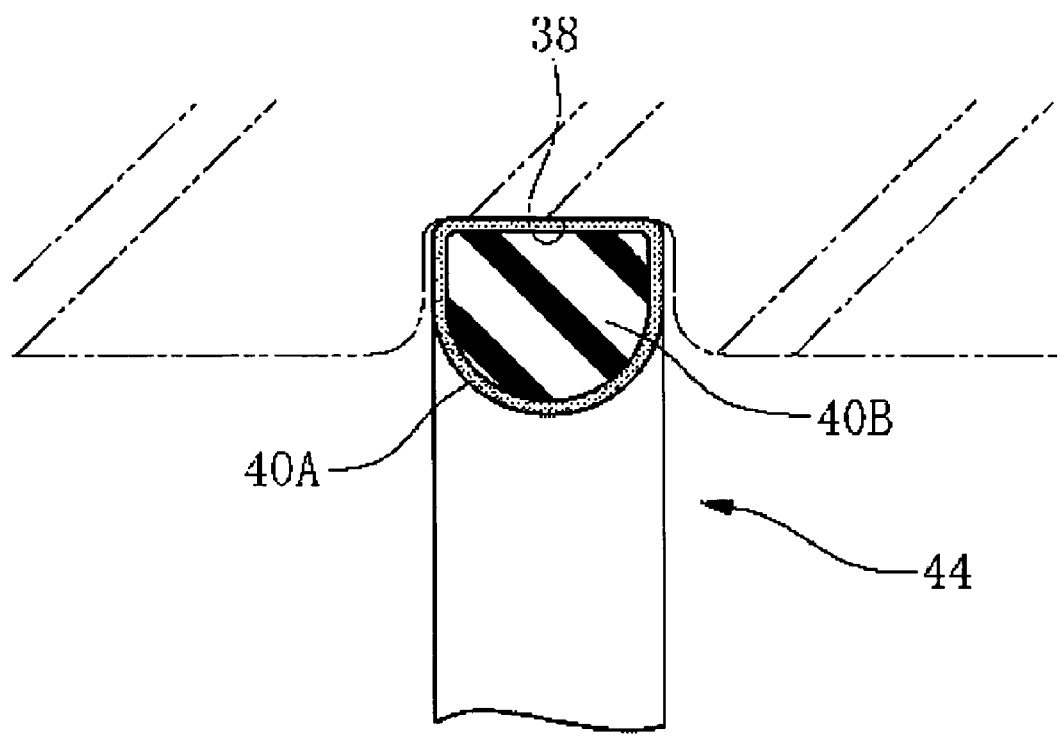

One example of this is shown in FIG. 4. In this example in FIG. 4(A), elastic sealing ring 42 is constituted in a flat strip configuration that possesses a fixed thickness.

Suitable combinations of the constituent material of outer layer 40A and the constituent material of core part (inner layer) 40B in elastic sealing ring 42 having a flat strip configuration are shown in the following Table 2 which indicates the total thickness d, thickness e of the outer layer 40A, thickness f of the core part (inner layer) 40B and length g as shown in FIG. 4(A) for elastic sealing ring 42 having a flat strip configuration along with the corresponding preferred values.

In this constitution, elastic sealing ring 48 has a flattened strip configuration, and this elastic sealing ring 48 does not protrude from ring groove 46 but is retained within ring groove 46.

Elastic sealing ring 48 also does not protrude from the inner surface of end part 16 in the radial direction inward.

At the same time, protuberance 22 of companion pipe 18 is provided on the tip of the inserted end of companion pipe 18, this protuberance 22 exerts elastic compression in the radial direction outward against elastic sealing ring 48, and the portion near the tip of companion pipe 18 containing protuberance 22 makes elastic contact against the inner surface of elastic sealing ring 48.

Also in the present embodiment, elastic sealing ring 48 is formed from a double-layer constitution that comprises an outer layer 40A of a material with low permeability to fuel and a core part 40B of a material with low temperature-resistance.

Suitable constituent materials and their combinations for outer layer 40A and core part 40B are fundamentally the same as above.

Figure 6:
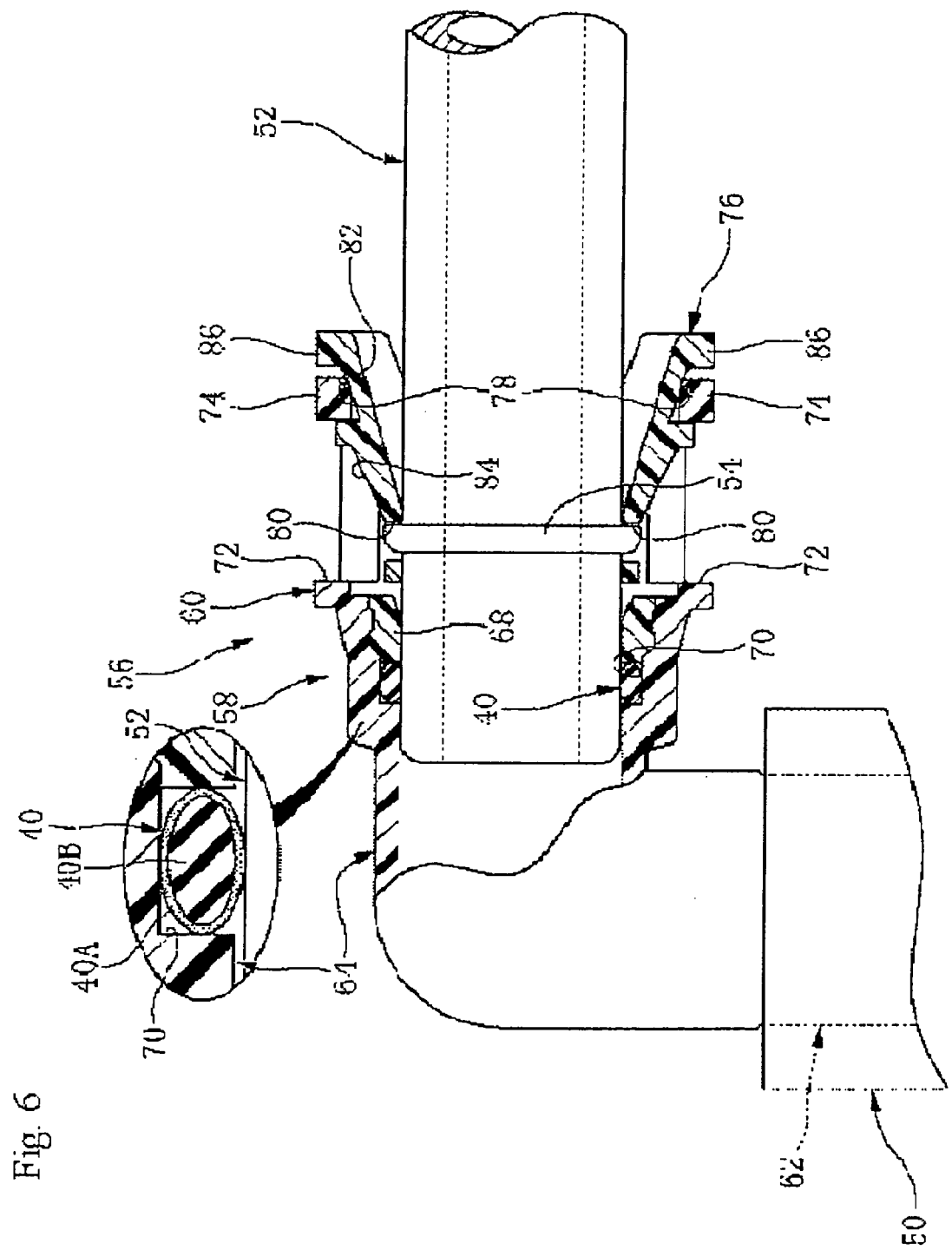
FIG. 6 shows the design of a further additional embodiment of the present invention.
Figure 7:
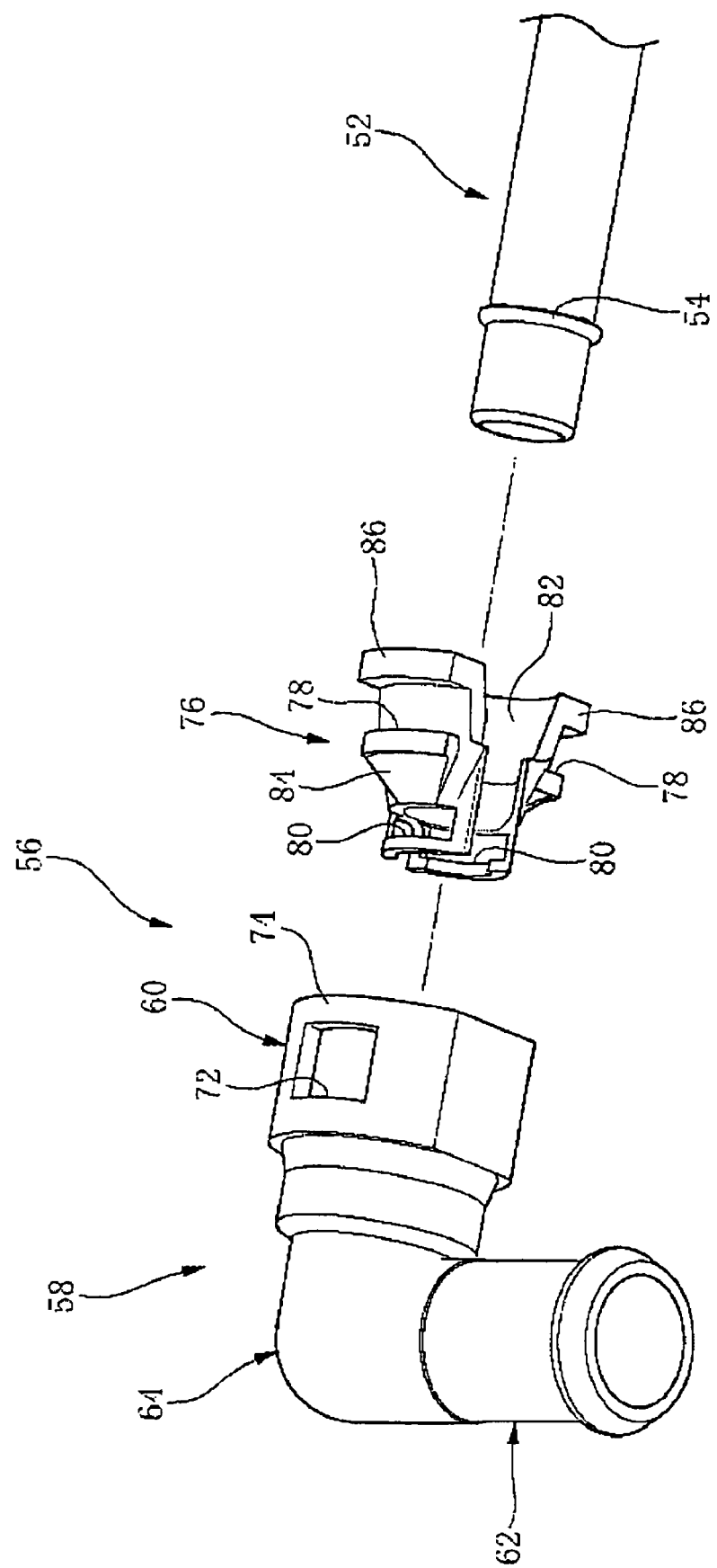
FIG. 7 shows an exploded perspective view of the quick connector and companion pipe of FIG. 6.
Figure 8:
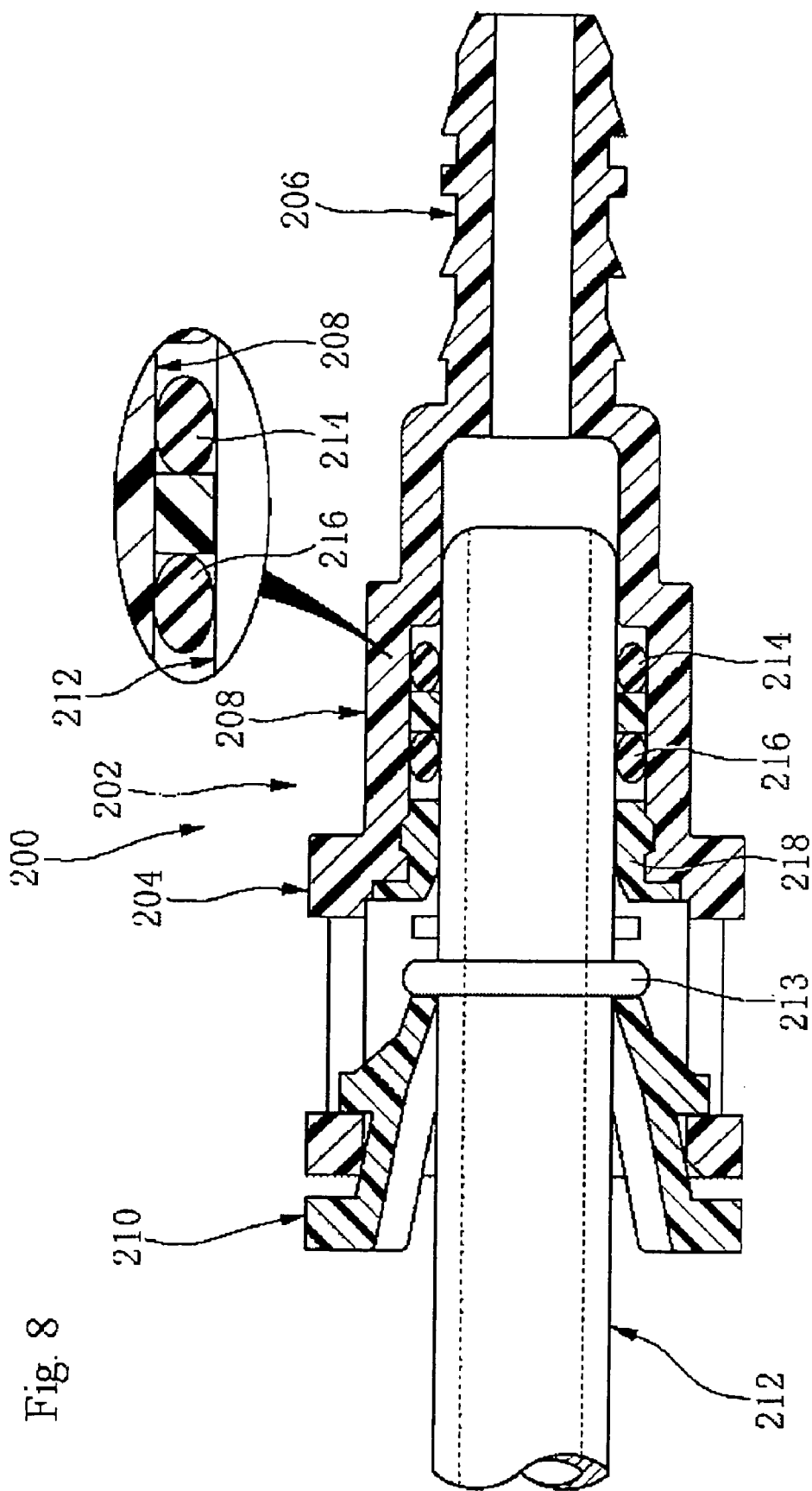
FIG. 8 shows the design of a conventional connecting configuration with a quick connector with a mounted an elastic sealing ring and a companion pipe.

Additional embodiments of the present invention are shown in FIGS. 6 and 7.

In these Figures, 50 is a fuel supply hose (referred to below simply as hose), and 52 is a metal companion pipe, provided in a position near the tip with ring-shaped engagement flange component 54 that protrudes in the radial direction outward.

Component 56 is quick connector that is a connection joint that connects hose 50 with companion pipe 52, and 58 is a connector body (made of resin) that forms the main body Connector body 58 has an elbow-shaped tube as the main body, with companion pipe 52 inserted into socket-shaped

TABLE 2

Elastic sealing ring (flat strip) Materials and Dimensions

| Materials | | Dimensions (mm) | | | |
|---|---|---|---|---|---|
| | | Thickness | | | |
| Outer layer | Inner layer | Total thickness (d in the Figure) | Outer layer thickness (e in the Figure) | Inner layer thickness (f in the Figure) | Length (g in the Figure) |
| Fluoro rubber (FKM) (for example vinylidene fluoride-hexafluoro- propylene fluoro rubber copolymers) | NBR | 1~3 | 0.005~0.2 | 0.8~2.995 | 1~15 |
| | NBR + PVC | 1~3 | 0.005~0.2 | 0.8~2.995 | 1~15 |
| | FVMQ | 1~3 | 0.005~0.2 | 0.8~2.995 | 1~15 |
| | VMQ | 1~3 | 0.005~0.2 | 0.8~2.995 | 1~15 |
| | EPDM | 1~3 | 0.005~0.2 | 0.8~2.995 | 1~15 |
| | TPO | 1~3 | 0.005~0.2 | 0.8~2.995 | 1~15 |
| Fluororesin (THV) (PVDF) (ETFE) (PTFE) | NBR | 1~3 | 0.05~0.2 | 0.8~2.95 | 1~15 |
| | NBR + PVC | 1~3 | 0.05~0.2 | 0.8~2.95 | 1~15 |
| | FVMQ | 1~3 | 0.05~0.2 | 0.8~2.95 | 1~15 |
| | VMQ | 1~3 | 0.05~0.2 | 0.8~2.95 | 1~15 |
| | EPDM | 1~3 | 0.05~0.2 | 0.8~2.95 | 1~15 |
| | TPO | 1~3 | 0.05~0.2 | 0.8~2.95 | 1~15 |

Additionally, an example is given in FIG. 4(B) of elastic sealing ring 44 as a D-ring having a D-shape in cross-section.

Moreover, constitutions with other various configurations of the elastic sealing ring are possible.

Figure 5:
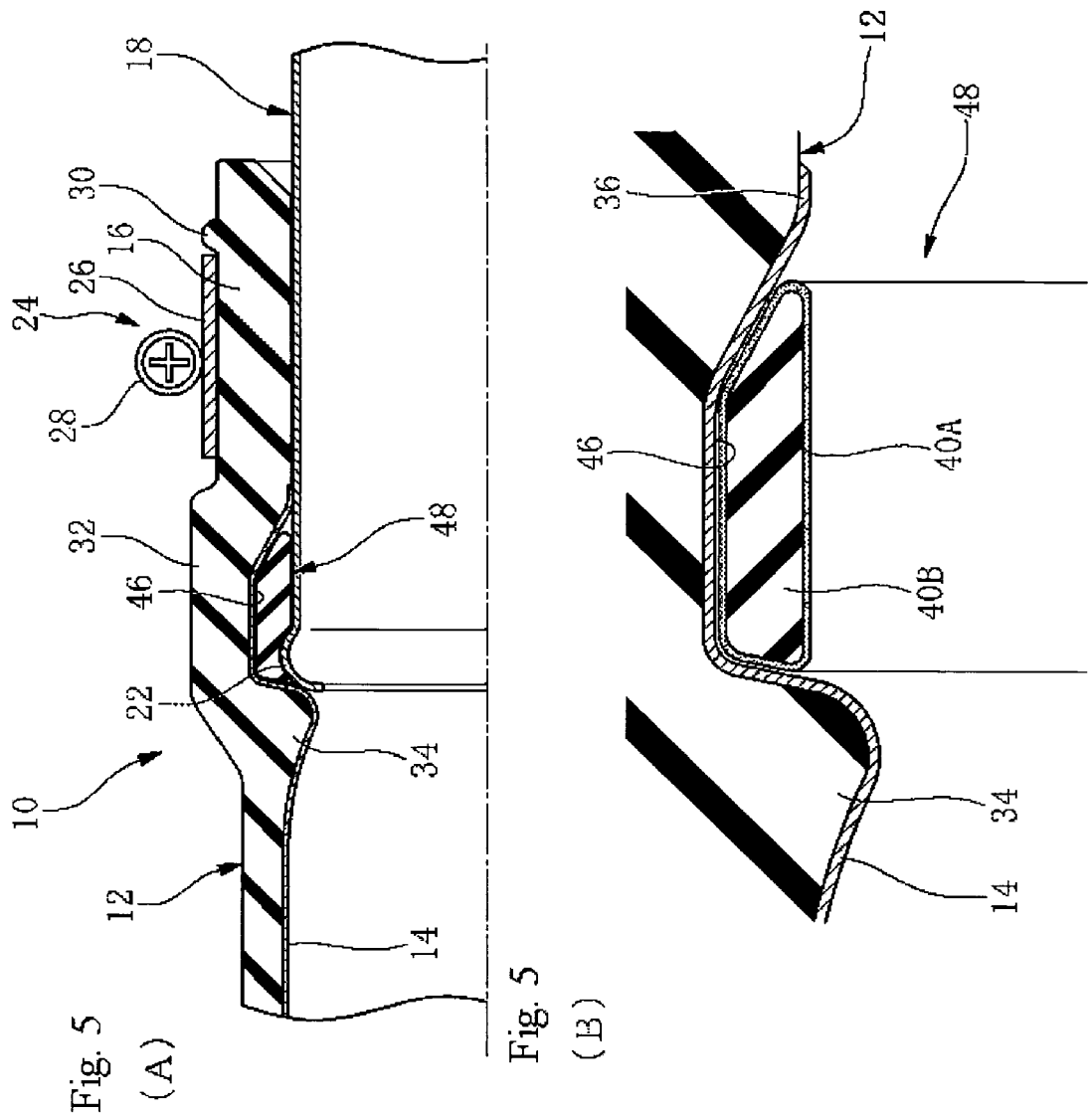
FIGS. 5A and 5B show the design of another embodiment of the present invention.

Other embodiments of the present invention are shown in FIG. 5.

retainer holding component 60 at one end in the axial direction, and with hose connector part 62 at the other end, and housing 64 is provided in between.

This hose connector 62 is inserted into the end of hose 50, and the end of hose 50 is fixed by a spring clamp that has been omitted from the diagram.

Connector body 58 is more to the inside of hose connector part 62 than retainer holder component 60, more concretely, elastic sealing ring 40 and resin bushing 68 are mounted inside housing 64, elastic sealing ring 40 makes elastic contact and forms a seal by inserting outside the external peripheral surface of the inserted companion pipe 52.

Furthermore, elastic sealing ring 40 is attached and retained in ring groove 60 that is formed in housing 64.

Aperture-shaped window component 72 is provided in retainer holder component 60, and along the front edge of the frame on the outer peripheral side of window component 72 (on the right side in the Figure), groove-shaped engagement component 78 (outer peripheral engagement component) in retainer 76 and engagement flange component 74 are joined together.

Retainer 76 is a resin member with the entire body formed in a C-shape, so that it can be elastically deformed in the radial direction.

This retainer 76 is engaged with the engagement flange component 74 of the retainer holding component 60 in groove-shaped engagement component 78 of the outer peripheral side, and retainer holding component 60 is maintained in a fixed condition along the axial direction due to the engagement action In addition, the inner peripheral side of retainer 76 is provided with aperture-shaped engagement component (engagement component on the inner peripheral side) 80, and when engagement flange component 54 of companion pipe 52 is inserted into engagement component 80, the engagement flange component 54 in question becomes locked along the axial direction, and companion pipe 52 is prevented from falling out.

Furthermore, retainer 76 is provided with inner peripheral cam surface 82 and outer peripheral cam surface 84 as guides for engaging the inner peripheral surface and outer peripheral surface.

Inner peripheral cam surface 82 and outer peripheral cam surface 84 operate respectively as follows.

In other words, with retainer 76 held by retainer holding component 60, companion pipe 52 is inserted in the axial direction, together with inner peripheral cam surface 82 acting as an insertion guide when it contacts engagement flange component 54 of companion pipe 52, retainer 76 is elastically enlarged and opened by the action of the cam.

Then, when engagement flange component 54 reaches aperture-shaped engagement component 80, retainer 76 elastically returns to a reduced diameter after the enlarging and opening, so that engagement component 80 of retainer 76 and engagement flange component 54 of companion pipe 52 become locked together along the axial direction.

In this way companion pipe 52 is prevented from falling out of connector body 58.

In this case where companion pipe 52 can also be inserted after retainer 76 has previously been installed in companion pipe 52, when companion pipe 52 is inserted into connector body 58, along with outer peripheral cam surface 84 of retainer 76 acting as an insertion guide when it contacts engagement flange component 74 in the retainer holding component 60, retainer 76 will be elastically deformed in the direction of reducing the diameter.

The outer peripheral side of engagement component 78 will reach the engagement flange component 74 of the retainer holding component 60, retainer 76 will return to being enlarged and opened after the diameter has been elastically constricted, so that engagement component 78 and engagement flange component 74 will become locked together along the axial direction.

Furthermore, the tip of retainer 76 is provided with control knobs 86 in order to control the deformation in the direction of reducing the diameter.

In the present embodiment, companion pipe 52 is inserted into the interior of retainer holding component 60 of connector body 58 so that companion pipe 52 is fixed within connector body 58, giving simple quick connector 56, or in other words, so that hose 50 and companion pipe 52 can be connected.

When using this type of quick connector to connect hose 50 with companion pipe 52, heretofore, at least 2 elastic sealing rings were used including a low permeability elastic sealing ring having impermeability to fuel and an elastic sealing ring with excellent low temperature performance, but since the embodiments as shown in the diagrams provide a single elastic sealing ring 40 having both functions of low permeability to fuel and excellent low temperature performance with elastic strength at low temperatures, the 2 elastic sealing rings in conventional usage are no longer required, and it is possible to realize 2 functions with a single elastic sealing ring 40 in a satisfactory manner.

In other words, installation of a single elastic sealing ring 40 in the embodiment is satisfactory, with the result that housing 64 in quick connector 56, and therefore quick connector 56, can have a compact constitution, and moreover a single elastic sealing ring 40 alone will provide a satisfactory fitting, and it is possible to reduce the time and effort to do the fitting of the elastic sealing ring 40.

In addition, since it is possible to constitute a compact quick connector 56, it is also possible to make a mutual connection between companion pipe 52 and hose 50 with a minimal connection spacing, and thus to reduce the overall spacing needed for the piping in an automotive fuel supply system.

Furthermore, while it is possible to use an O-ring as elastic sealing ring 40, it is certainly also possible to use a variety of other configurations of elastic sealing ring to form a seal.

It should be understood that the elastic sealing ring of the present invention could have a triple layer or higher multi-layer constitution, and other configurations that do not exceed the present invention are within the scope hereof.

What we claim is:

1. A piping assembly, comprising:
    a fuel supply hose that extends in an axial direction and that has an open end, an outer surface and an inner peripheral surface;
    a companion pipe that has a leading edge that is inserted into the open end of the fuel supply hose so that the fuel supply hose overlaps the companion pipe in a direction that is radial to the axial direction;
    an annular protuberance that protrudes outwardly from the companion pipe in the radial direction, wherein the fuel supply hose overlaps the annular protuberance in the radial direction;
    one annular ring groove formed in the inner peripheral surface of the fuel supply hose, wherein the annular ring groove overlaps the companion pipe in the radial direction;
    exactly one elastic sealing ring disposed in the annular ring groove, wherein the elastic sealing ring has an inner core layer that is formed from a material possessing low temperature-resistance characteristics in order to maintain high elasticity at low temperature and an outer layer covering the inner core layer and formed from a material possessing impermeability to fuel; and a clamping member that is clamped on the outer surface of the fuel supply hose at a location that is proximate the open end;

wherein the elastic sealing ring is pressed between the fuel supply hose and the companion pipe at a location between the leading edge and the protuberance to form a seal between the fuel supply hose and the companion pipe; and wherein the annular ring groove, protuberance and clamping member do not overlap in the radial direction and wherein the protuberance is located between the annular ring groove and the clamping member in the axial direction.

2. The piping assembly as set forth in claim 1, wherein the protuberance contacts with and bites into the inner peripheral surface of the end portion of the fuel supply hose.

3. The piping assembly as set forth in claim 2, wherein a portion of the protuberance protruding outermost in a radial direction of the companion pipe pushes back the inner peripheral surface of the end portion of the fuel supply hose almost up to or close to a radial position of a bottom surface of the annular ring groove.

4. The piping assembly as set forth in claim 1, wherein the annular ring groove and the elastic sealing ring are sized so that when the elastic sealing ring is pressed between the fuel supply hose and the companion pipe, the elastic sealing ring is deformed and axially opposite end portions of the elastic sealing ring contact axially opposite side portions of the annular ring groove, respectively.

5. The piping assembly as set forth in claim 1, wherein the outer low permeability layer is formed from a fluoro rubber and the inner core layer is formed from nitrile rubber (NBR)+ polyvinyl chloride (PVC).

6. The piping assembly as set forth in claim 1, wherein the outer low permeability layer is formed from a fluoro rubber and the inner core layer is formed from fluorosilicone rubber (FVMQ).

7. The piping assembly as set forth in claim 1, wherein the outer low permeability layer is formed from a fluoro rubber and the inner core layer is formed from hermoplastic olefin (TPO).

8. The piping assembly as set forth in claim 1, wherein the portion of the companion pipe between the leading edge and the protuberance has the same diameter throughout an entire length of the portion.

9. The piping assembly as set forth in claim 1, wherein the portion of the companion pipe between the leading edge and the protuberance has a length in an axial direction at least three times longer than the elastic sealing ring.

10. The piping assembly as set forth in claim 1, wherein the protuberance has a length in an axial direction longer than the elastic sealing ring.

* * * * *